(12) United States Patent
Miyata

(10) Patent No.: US 12,175,138 B2
(45) Date of Patent: Dec. 24, 2024

(54) INFORMATION PROCESSING APPARATUS, INFORMATION PROCESSING SYSTEM, AND CONTROL METHOD FOR INFORMATION PROCESSING APPARATUS

(71) Applicant: CANON KABUSHIKI KAISHA, Tokyo (JP)

(72) Inventor: Takaaki Miyata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/490,623

(22) Filed: Oct. 19, 2023

(65) Prior Publication Data

US 2024/0143240 A1  May 2, 2024

(30) Foreign Application Priority Data

Oct. 27, 2022  (JP) .................................. 2022-171911

(51) Int. Cl.
  *G06F 3/12* (2006.01)
(52) U.S. Cl.
  CPC .......... *G06F 3/1204* (2013.01); *G06F 3/1238* (2013.01); *G06F 3/1253* (2013.01)
(58) Field of Classification Search
  CPC ..... G06F 3/1204; G06F 3/1238; G06F 3/1253
  See application file for complete search history.

(56) References Cited

U.S. PATENT DOCUMENTS

| | | | |
|---|---|---|---|
| 2016/0006887 A1* | 1/2016 | Takenaka | H04N 1/00925 358/1.13 |
| 2017/0230543 A1* | 8/2017 | Futamata | G06F 3/1204 |
| 2017/0358047 A1* | 12/2017 | Esposito | G06Q 10/0631 |
| 2019/0317709 A1* | 10/2019 | Sugimoto | G06F 3/1204 |
| 2020/0213457 A1* | 7/2020 | Takahashi | H04N 1/00384 |
| 2020/0356769 A1* | 11/2020 | Kato | G06V 30/416 |
| 2021/0350088 A1* | 11/2021 | Ravi | G06F 40/284 |

FOREIGN PATENT DOCUMENTS

JP  2019109752 A  7/2019

* cited by examiner

*Primary Examiner* — Akwasi M Sarpong
*Assistant Examiner* — Michael L Burleson
(74) *Attorney, Agent, or Firm* — Canon U.S.A., Inc. IP Division

(57) ABSTRACT

An information processing apparatus communicatively connected to a user terminal and an image forming apparatus, the information processing apparatus includes one or more controllers having one or more processors and one or more memories, the one or more controllers being configured: to receive a message of a text described in a natural language from the user terminal, to determine information about a device setting of the image forming apparatus from a word included in the message, and to transmit the information about the determined device setting to the image forming apparatus.

18 Claims, 13 Drawing Sheets

FIG.5A

| SETTING CONTENT | DATABASE ID (SETTING ITEM) | DATABASE VALUE (SETTING VALUE) | ADMINISTRATOR AUTHORITY |
|---|---|---|---|
| READ SCANNED DOCUMENT IN PDF FORMAT INTO USB MEMORY | USB_SCAN_TYPE | PDF | NOT REQUIRED |
| READ SCANNED DOCUMENT IN JPEG FORMAT INTO USB MEMORY | | JPEG | |
| READ SCANNED DOCUMENT IN TIFF FORMAT INTO USB MEMORY | | TIFF | |
| PERMIT STORAGE IN USB MEMORY | USB_SCAN_ENABLE | 1 | REQUIRED |
| NOT PERMIT STORAGE IN USB MEMORY | | 0 | |

FIG.5B

```
<?xml version="1.0" encoding="UTF-8" ?>
<MFP_Settings>
 <setting>
  <id>USB_SCAN_TYPE</id>
  <value>PDF</value>
 </setting>
</MFP_Settings>
```

FIG.6A

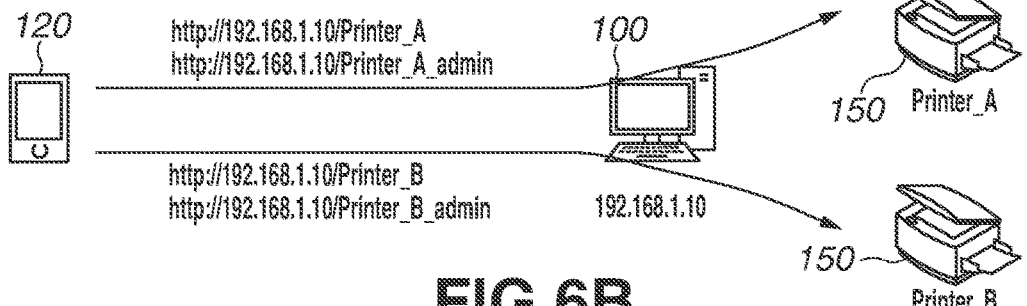

FIG.6B

| WORD INCLUDED IN SETTING MESSAGE | DATABASE ID TO BE CORRECTION TARGET | ADMINISTRATOR AUTHORITY |
|---|---|---|
| SCAN, USB | | |
| SCAN, USB MEMORY | | |
| SCANNER, USB | USB_SCAN_TYPE | NOT REQUIRED |
| DOCUMENT READING, USB | | |
| READ DOCUMENT, USB | | |
| ⋮ | | |
| USB MEMORY, SAVE, PERMIT | | |
| USB, STORE, PERMIT | USB_SCAN_ENABLE | REQUIRED |
| USB, SAVE, CAN | | |
| ⋮ | | |

FIG.6C

| DATABASE ID TO BE CORRECTION TARGET | WORD INCLUDED IN SETTING MESSAGE | CORRECTION VALUE FOR DATABASE ID | TEXT TO BE NOTIFIED TO USER TERMINAL IN A CASE WHERE SETTING IS SUCCESSFUL IN IMAGE FORMING DEVICE |
|---|---|---|---|
| USB_SCAN_TYPE | PDF | PDF | IT IS SET TO READ THE SCANNED DOCUMENT INTO THE USB MEMORY IN PDF FORMAT. |
| | PDF | | |
| | portable document file | | |
| | ⋮ | | |
| | JPEG | JPEG | IT IS SET TO READ THE SCANNED DOCUMENT INTO THE USB MEMORY IN JPEG FORMAT. |
| | JPG | | |
| | ⋮ | | |
| | TIFF | TIFF | IT IS SET TO READ THE SCANNED DOCUMENT INTO THE USB MEMORY IN TIFF FORMAT. |
| | ⋮ | | |
| USB_SCAN_ENABLE | DO | 1 | STORAGE IN THE USB MEMORY IS PERMITTED. |
| | PERMIT | | |
| | ⋮ | | |
| | NOT | 0 | STORAGE IN THE USB MEMORY IS PROHIBITED. |
| | PROHIBIT | | |
| | NOT PERMITTED | | |
| | ⋮ | | |

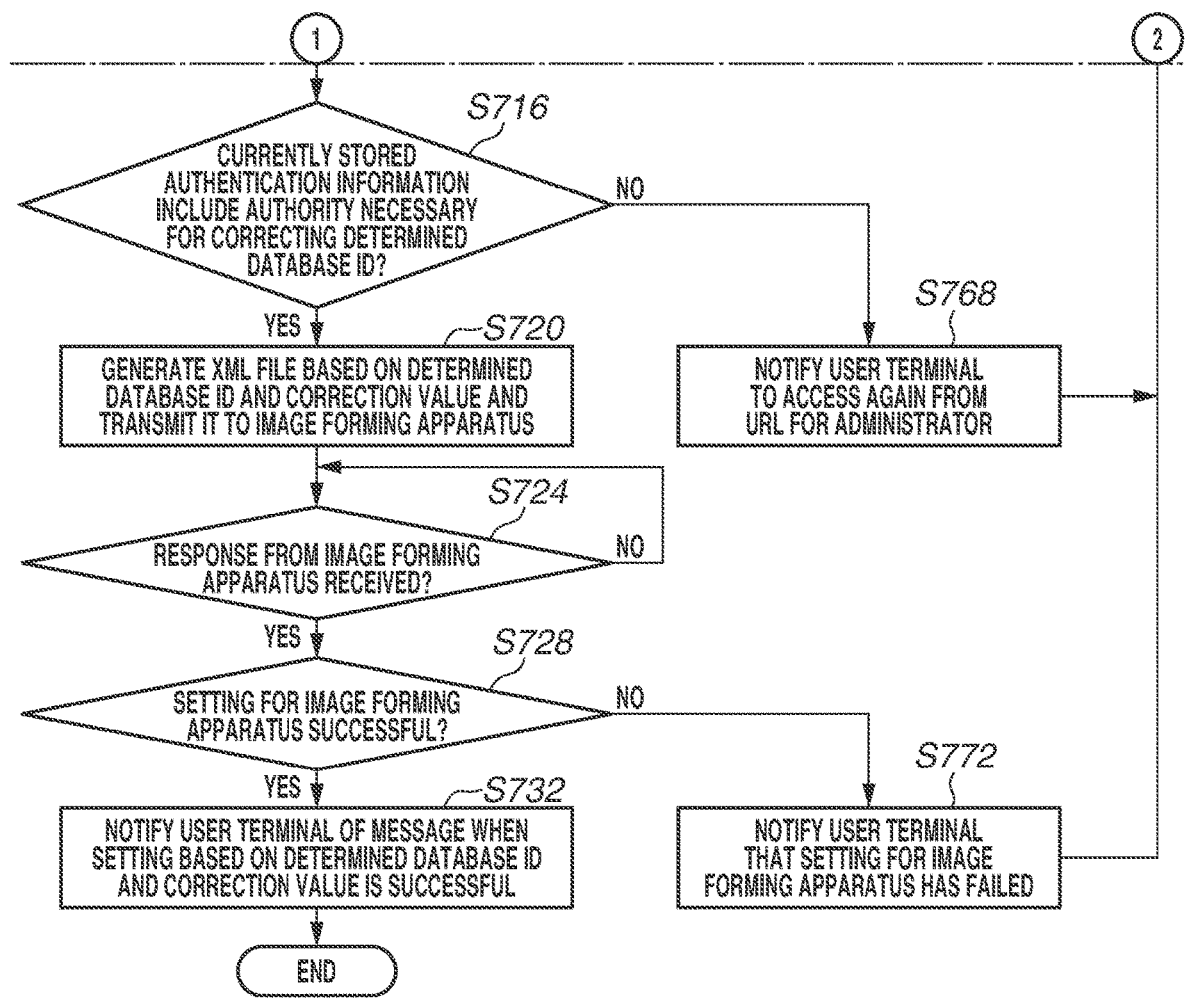

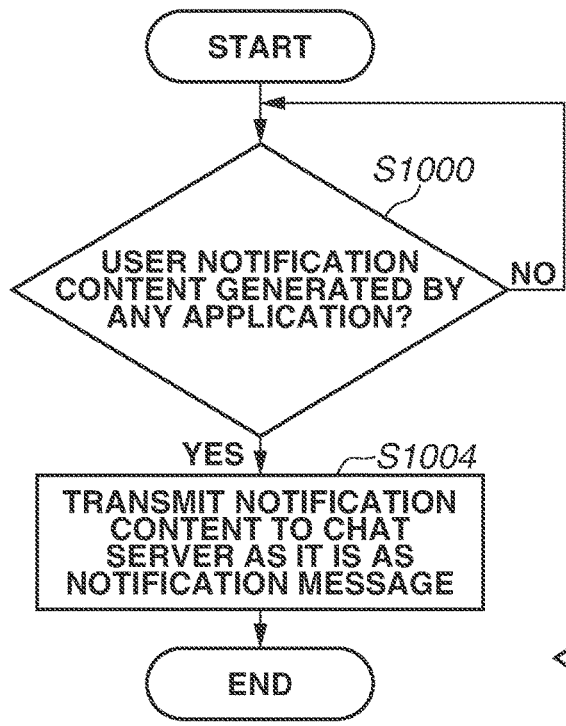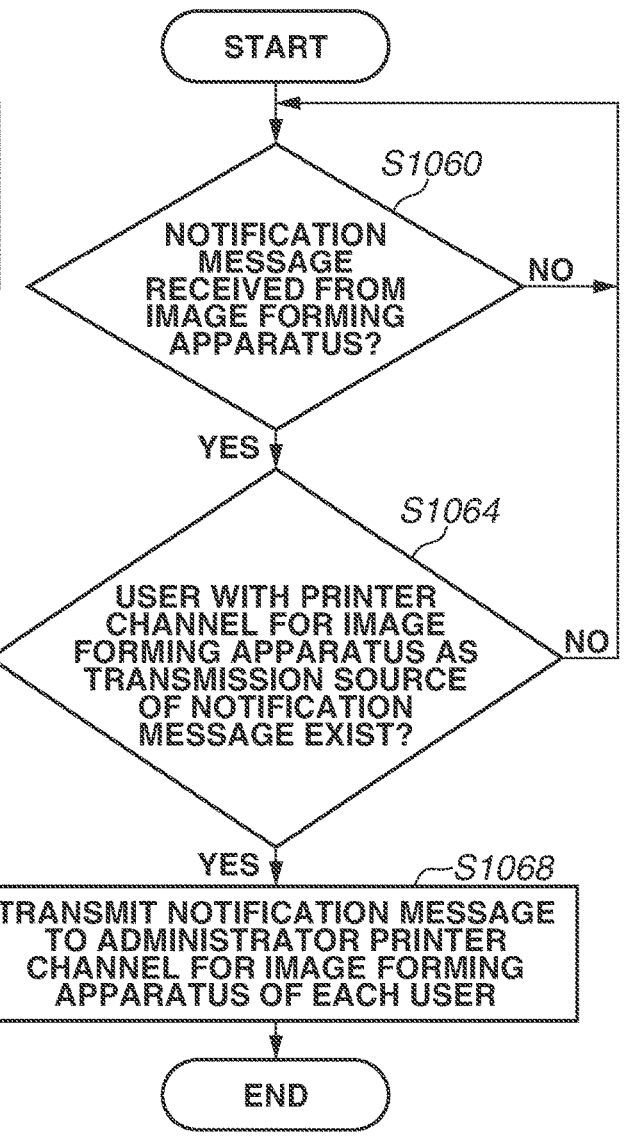

INFORMATION PROCESSING APPARATUS, INFORMATION PROCESSING SYSTEM, AND CONTROL METHOD FOR INFORMATION PROCESSING APPARATUS

BACKGROUND

Field of the Disclosure

The present disclosure relates to an information processing apparatus, an information processing system, and a control method for the information processing apparatus.

Description of the Related Art

Image forming apparatuses having a plurality of functions such as functions of a copying machine, printer, scanner, facsimile machine, and a display unit have become widespread, and as a result, diverse setting items are provided for various functions. These device settings can be performed by operating a display unit, but an image forming apparatus provided with a remote user interface (UI) mechanism is also widely known so that a setting can be performed even from an operation terminal remote from the image forming apparatus. The remote UI is a mechanism in which an Internet browser operating on a remote control terminal is connected to an image forming apparatus and, in a case where a setting item output to the browser is corrected, the corrected content is immediately reflected to the image forming apparatus.

On the other hand, with a recent dramatic improvement in machine learning technology, many methods using a natural language have become common as an interface between a human and a device, as typified by a framework referred to as a chatbot. For example, according to Japanese Patent Application Laid-Open No. 2019-109752, if a user inputs a printing purpose in a natural language to a chat application, a printer that matches the purpose is suggested.

Since the remote UI has an extremely large number and a wide variety of setting items, and in many cases, a setting location has a tree structure for each functional area, the location may be very deep depending on the item. Thus, if a user does not clearly know a location of a setting item on the remote UI, such as in a case where he or she wants to make some settings on the remote UI for the first time instead of performing a fixed setting on a regular basis, it may be difficult to find the setting item.

SUMMARY

According to an aspect of the present disclosure, an information processing apparatus communicatively connected to a user terminal and an image forming apparatus, the information processing apparatus includes one or more controllers having one or more processors and one or more memories, the one or more controllers being configured: to receive a message of a text described in a natural language from the user terminal, to determine information about a device setting of the image forming apparatus from a word included in the message, and to transmit the information about the determined device setting to the image forming apparatus.

Further features of the present disclosure will become apparent from the following description of embodiments with reference to the attached drawings.

BRIEF DESCRIPTION OF THE DRAWINGS

FIG. 5A illustrates an example of a database managed by a database management system of the image forming apparatus. FIG. 5B illustrates an example of an Extensible Markup Language (XML) description managed by the database management system of the image forming apparatus.

FIG. 6A illustrates an example of a setting transmission method between the chat server and the image forming apparatus. FIGS. 6B and 6C respectively illustrate an example of a database identification (ID) determination rule and a correction value determination rule in the chat server.

FIGS. 7A and 7B are an example of a flowchart illustrating processing performed by the chat server at a time of receiving a setting message.

FIG. 10A is an example of a flowchart illustrating processing by the image forming apparatus in making a notification to the user terminal. FIG. 10B is an example of a flowchart illustrating processing by the chat server at a time of receiving a notification.

DESCRIPTION OF THE EMBODIMENTS

Exemplary embodiments for implementing the present disclosure will be described with reference to the attached drawings.

A first embodiment is described with reference to FIGS. 1 to 9. According to the first embodiment, a user inputs a setting content in a natural language to a chat server. Upon receiving the input, the chat server converts the setting content in the natural language into a data format that an image forming apparatus can interpret and transmits the setting content in converted data format. Then, the image forming apparatus changes the setting according to the data format.

Figure 1:
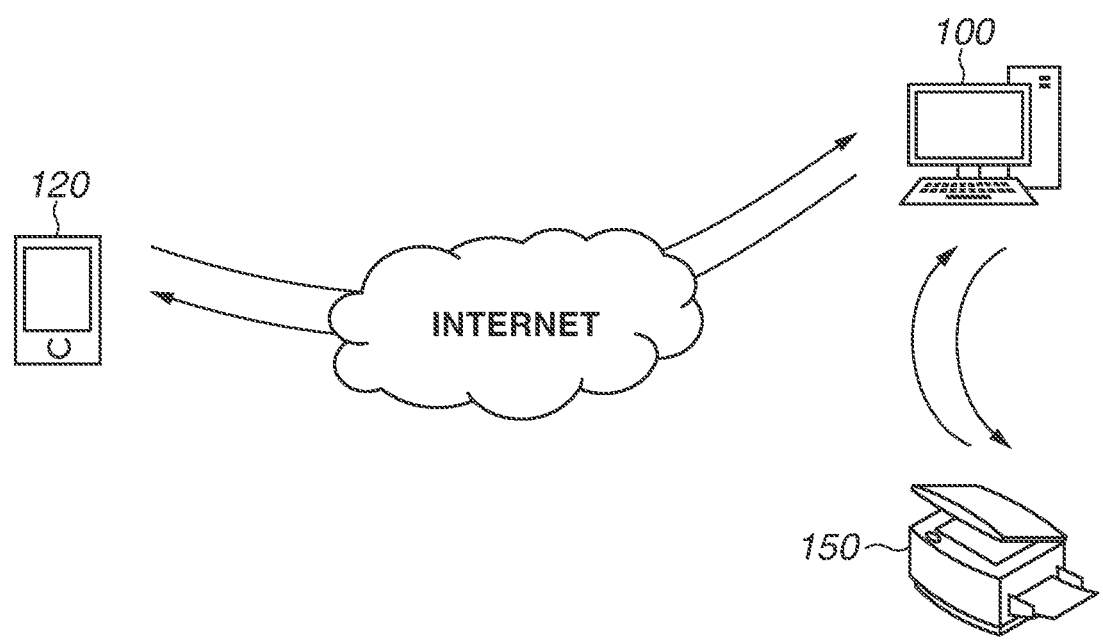
FIG. 1 illustrates an example of a system configuration diagram according to an embodiment.

FIG. 1 illustrates a system configuration diagram according to the present embodiment. The system configuration diagram in FIG. 1 includes a user terminal 120, a chat server 100, and an image forming apparatus 150. All of these devices have communication functions and can be connected to each other via a network. In FIG. 1, the chat server 100 is connected to one user terminal 120 and one image forming apparatus 150, but the number of user terminals and image forming apparatuses that can communicate with the chat server 100 is not limited to one, and a plurality of user terminals and image forming apparatuses may be connected. According to the present embodiment, the chat server 100 is referred to as an information processing apparatus.

An example of using the system illustrated in FIG. 1 is as follows. In a case where a user wants to change a setting for the image forming apparatus 150, first, the user inputs a setting content for the image forming apparatus 150 in the natural language to the user terminal 120. Information in the natural language to be input is, for example, text information input via an operation unit and text information obtained by converting audio data input from a microphone. In response to this, the user terminal 120 transmits the input natural language to the chat server 100 as it is. The chat server 100 determines whether the received natural language is an appropriate setting for the image forming apparatus 150. If it is appropriate, the chat server 100 converts the setting into a data format that can be interpreted by the image forming apparatus corresponding to the setting content in the natural language and transmits the data format to the image forming apparatus 150. The image forming apparatus 150, which receives the data format, changes the setting of the image forming apparatus 150 according to the received data format, and responds to the chat server 100 with a setting result. The chat server 100 generates a message based on the response from the image forming apparatus 150 as a response to a message from the user and transmits the message to the user terminal 120. Here, the message is text information received from the user. Through the series of processing, the user can know in the natural language, at the user terminal 120, whether the input setting content is set in the image forming apparatus 150.

FIG. 1 does not limit the network configuration according to the present embodiment, and the user terminal 120, the chat server 100, and the image forming apparatus 150 may all exist on the same network within the Internet, for example, within an intranet. Alternatively, only the chat server 100 may exist on a different network from the user terminal 120 and the image forming apparatus 150 via the Internet.

Figure 2:
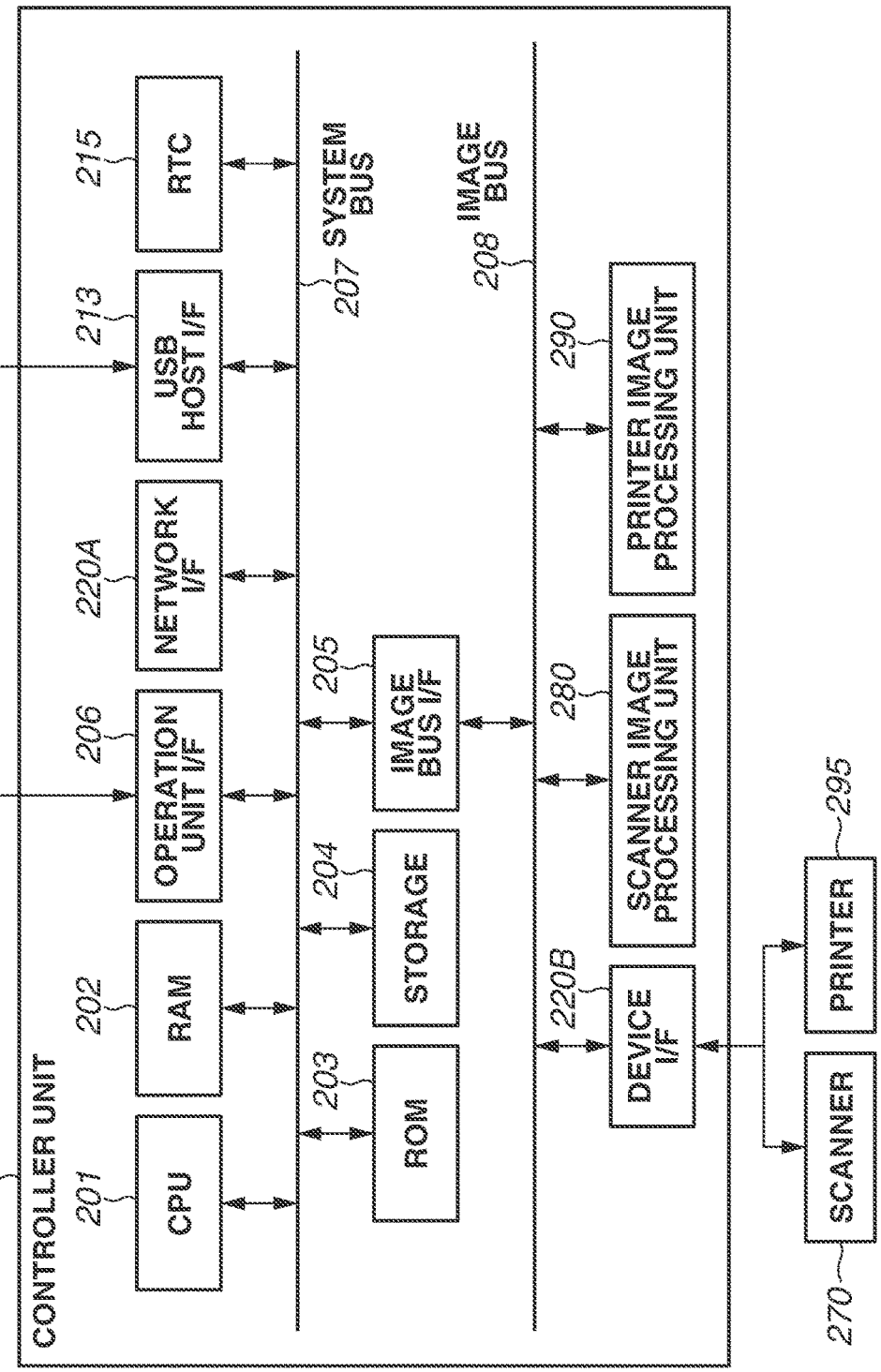
FIG. 2 illustrates an example of a hardware configuration diagram of an image forming apparatus.

FIG. 2 is a hardware configuration diagram illustrating an example of a configuration of a main part in the image forming apparatus 150. The image forming apparatus 150 includes a controller unit 200 to which a scanner 270 as an image input device, a printer 295 as an image output device, and an operation unit 212 are connected. The controller unit 200 performs control to realize a copy function of printing and outputting image data read by the scanner 270 from the printer 295.

The controller unit 200 includes a central processing unit (CPU) 201, and the CPU 201 starts up an operation system (OS) according to a boot program stored in a read-only memory (ROM) 203. The CPU 201 executes a program stored in a storage 204 on the OS to execute various types of processing. A random access memory (RAM) 202 is used as a work area of the CPU 201. The RAM 202 provides the work area as well as an image memory area for temporarily storing image data. The programs stored in the storage 204 include ones responsible for basic functions of the image forming apparatus, such as printing and scanning, and ones providing a remote user interface (UI) application that receives a request to a remote UI and an authentication system therefor. Further, according to the present embodiment, at least a database management system, a parser of a data description language, and a server application for receiving transmission of the data description language from an external host are included. All of the programs stored in the ROM 203 and the storage 204 run by the CPU 201 loading the programs into the RAM 202 and executing them.

The ROM 203 also stores setting values for various settings of the image forming apparatus 150 in a database format. According to the present embodiment, the ROM 203 is referred to as a storage unit. The setting value is set by a remote operation from the operation unit 212 and a remote host, which are described below. An application that runs on the OS is determined based on a part of the setting values, and the application includes the server application. The storage 204 further stores image data and information about a paper feed capacity including the maximum number of sheets that the image forming apparatus 150 can feed.

The CPU 201 is connected to another module via the system bus 207. An operation unit interface (I/F) 206 is an interface with the operation unit 212 having a touch panel, and outputs to the operation unit 212 image data to be displayed thereon. The operation unit OF 206 also transmits information input by a user on the operation unit 212 to the CPU 201. A network OF 220A is an interface for connecting the image forming apparatus 150 to a local area network (LAN).

A Universal Serial Bus (USB) host OF 213 is an interface unit that communicates with a USB storage 214. The USB host OF 213 is an output unit that stores data stored in the storage 204 in the USB storage 214. The USB host OF 213 also receives as input data stored in the USB storage 214 and transmits the data to the CPU 201. The USB storage 214 is an external storage device that stores data and can be attached to and detached from the USB host I/F 213. A plurality of USB devices including the USB storage 214 can be connected to the USB host I/F 213.

A real-time clock (RTC) 215 controls current time. Time information controlled by the RTC 215 is used to acquire time at which auto-shutdown is performed and to record job input time.

An image bus I/F 205 is a bus bridge for connecting a system bus 207 and an image bus 208 that transfers image data at high speed and converting the data format. The image bus 208 includes a peripheral component interconnect (PCI) bus or the like. A device I/F 220B, a scanner image processing unit 280, and a printer image processing unit 290 are provided on the image bus 208. The device I/F 220B is connected to the scanner 270 and the printer 295 and performs synchronous/asynchronous conversion of image data. The scanner image processing unit 280 performs correction, processing, and editing on input image data. The printer image processing unit 290 performs correction, resolution conversion, and the like on print output image data according to the printer 295.

Figure 3:
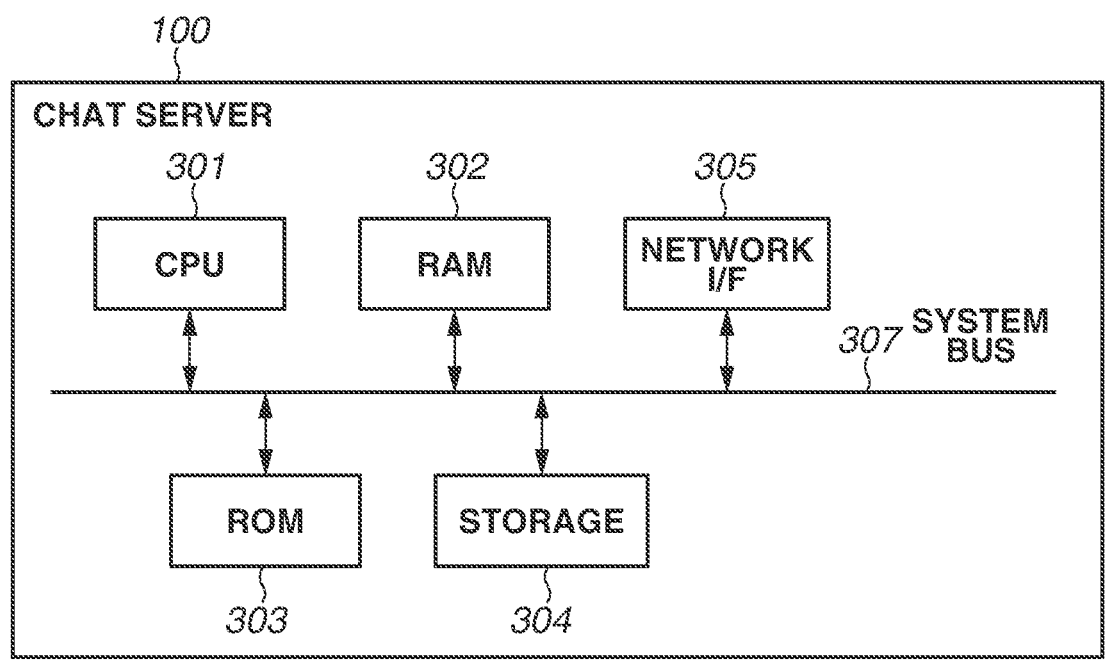
FIG. 3 illustrates an example of a hardware configuration diagram of a chat server.

FIG. 3 is a hardware configuration diagram illustrating an example of a configuration of a main part in the chat server 100.

The chat server 100 includes a CPU 301, and the CPU 301 starts up an OS according to a boot program stored in a ROM 303. The CPU 301 executes a program stored in a storage 304 on the OS to execute various types of processing. A RAM 302 is used as a work area of the CPU 301. The programs stored in the storage 304 include a chat server application that provides a chat service, a natural language processing library and various rules for interpreting a message from a user, and a generator of the data description language. All of the programs stored in the ROM 303 and the storage 304 run by the CPU 301 loading the programs into the RAM 302 and executing them. Further, in order for a user to transmit a setting message to the image forming apparatus 150, the chat server application provides a transmission means referred to as a printer channel to the user terminal 120 according to the image forming apparatus 150 and presence or absence of administrator authority. At this time, the chat server application may store a printer channel management table indicating which printer channel is used for each user. The CPU 301 is also connected to another module via a system bus 307. A network OF 305 is an interface for connecting the chat server 100 to the LAN.

Figure 4:
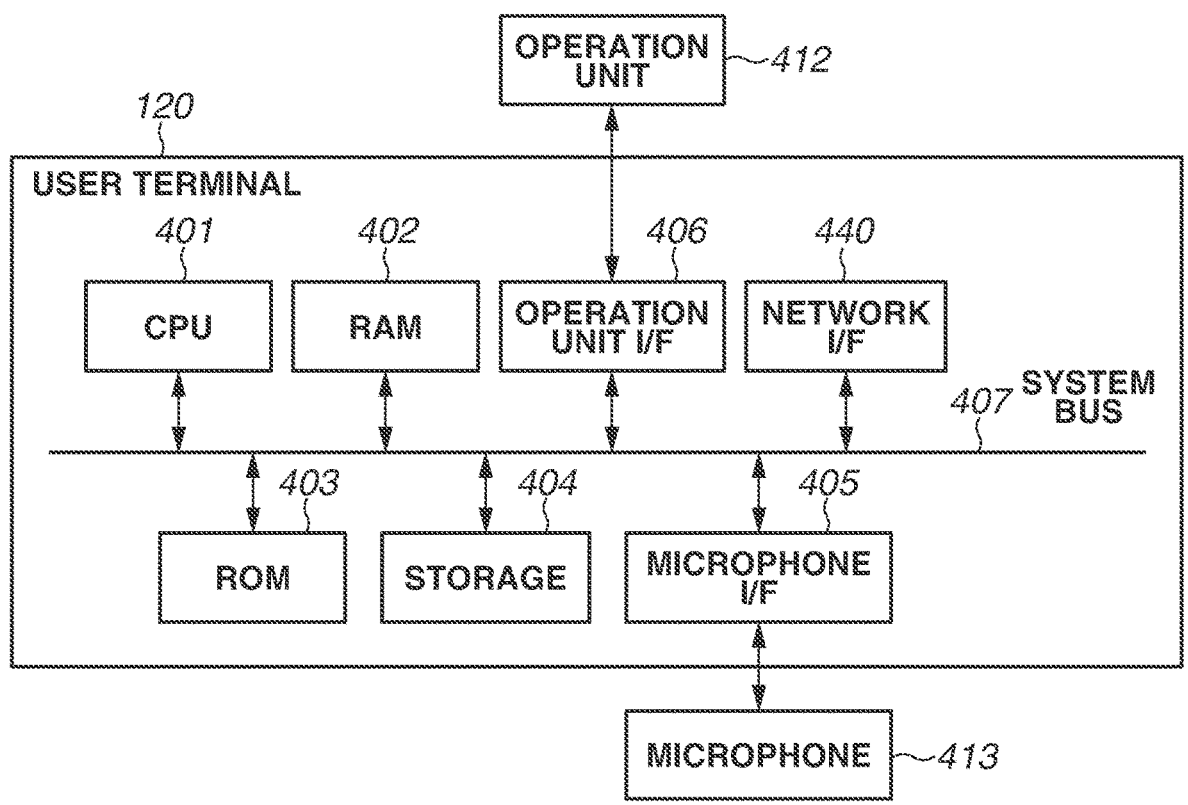
FIG. 4 illustrates an example of a hardware configuration diagram of a user terminal.

FIG. 4 is a hardware configuration diagram illustrating an example of a configuration of a main part in the user terminal 120. The user terminal 120 includes a CPU 401, and the CPU 401 starts up an OS according to a boot program stored in a ROM 403. The CPU 401 executes a program stored in a storage 404 on the OS to execute various types of processing. A RAM 402 is used as a work area of the CPU 401.

The programs stored in the storage 404 include an Internet browser or a chat application to access a chat service of another host. All of the programs stored in the ROM 403 and the storage 404 are run by the CPU 401 loading the programs into the RAM 402 and executing them. The CPU 401 is also connected to another module via a system bus 407. An operation unit OF 406 transmits information input by a user on an operation unit 412 to the CPU 401. A network OF 440 is an interface for connecting the user terminal 120 to the LAN.

A microphone 413 is, for example, a small micro-electromechanical system (MEMS) microphone installed in a smartphone or the like. A microphone OF 405 is connected to the microphone 413, converts audio input from the microphone 413 into encoded audio data, and stores the encoded audio data in the RAM 402 according to an instruction from the CPU 401.

FIGS. 5A and 5B illustrate an example of a database managed by the image forming apparatus 150 in the database management system and an example of an Extensible Markup Language (XML) description in a case where an operation of the database is performed using XML. XML is one of the data description languages described in American National Standard Code for Information Interchange (ASCII), and is capable of expressing a pair of a data attribute and a value independent of an OS or a CPU.

FIG. 5A illustrates a database to be used, by taking as an example, a use case in which the image forming apparatus 150 reads a document with a scanner and stores the read document in a USB memory. The database manages a device setting of the image forming apparatus 150 as a database. In the database, a database identification (ID) unique to each device setting is associated with a database value, which is a setting value of each device setting. Here, how to use the device setting is described with an example of storing a scanned document in a USB memory. First, it is necessary to set a file format in order to store the scanned document in the USB memory. Thus, the CPU 201 refers to the database ID of USB_SCAN_TYPE and acquires that one of Portable Document Format (PDF), Joint Photographic Experts Group (JPEG), and Tagged Image File Format (TIFF) is specified as the database value. Then, a document scanned in the specified file format can be stored in the USB memory. Here, the device setting is stored by storing the file format specified in advance by a user as the database value. If the user inputs an instruction to change the device setting, the device setting is changed by changing the database value. As another example, a setting for whether to permit storing the scanned document in the USB memory is described. According to the present embodiment, the setting can be made by making it possible to specify 0 or 1 as the database value for the database ID of USB_SCAN_ENABLE. Some of database IDs may require the administrator authority. According to the present embodiment, the database ID of USB_SCAN_ENABLE requires the administrator authority.

FIG. 5B illustrates an example of using XML as the data description language to be input to the database management system to change the database value. In FIG. 5B, the example is illustrated in which USB_SCAN_TYPE is specified in an id tag, and PDF is specified in a value tag. In a case where the XML file is input to the database management system, the scanned document is read into the USB memory in a PDF format. A method for inputting the XML file to the image forming apparatus 150 includes a method for transmitting the XML file from the external host via the network. According to the present embodiment, the server application operating on the image forming apparatus 150 receives transmission of the XML file from the chat server 100.

FIGS. 6A to 6C illustrate a method in which the chat server 100 transmits to the image forming apparatus 150 a setting for the image forming apparatus 150 in the natural language received from the user terminal 120.

FIG. 6A illustrates an example in which the user terminal 120 transmits a setting message in the natural language to the image forming apparatus 150 via the chat server 100. In FIG. 6A, an Internet Protocol (IP) address of the chat server 100 is 192.168.1.10, and two image forming apparatuses 150 names of which are Printer_A and Printer_B can perform network communication with the chat server 100. First, the user terminal 120 transmits the setting message in the natural language to the chat server 100 using a character string combining the IP address of the chat server 100 and the printer name of the image forming apparatus 150 as a Uniform Resource Locator (URL). In a case where the Internet browser is used by the user terminal 120, the user terminal 120 can communicate with the chat server 100 by inputting the above-described character string to a text box for inputting the URL. On the other hand, in a case where the chat application is used by the user terminal 120, by tapping a printer channel that indicates the printer name to be set in FIG. 9, which will be described below, the chat application internally uses the character string as the URL and communication with the chat server 100 is enabled. If communication is made from the user terminal 120 to the chat server 100, the chat server 100 converts the setting message in the natural language into the database ID and the database value to be corrected by natural language processing described below. Then, the chat server 100 transmits the database ID and the database value to the image forming apparatus 150 in the XML file format illustrated in FIG. 5B. At this time, if the URL is http://192.168.1.10/Printer_A, the XML file is transmitted to the image forming apparatus 150 the printer name of which is Printer_A. Of course, if the URL is http://192.168.1.10/Printer_B, the XML file is transmitted to the image forming apparatus 150 the printer name of which is Printer_B. Further, in a case where a setting that requires administrator authority for Printer_A is performed, http://192.168.1.10/Printer_A_admin is used as the URL.

FIGS. 6B and 6C illustrate a natural language processing method in which the chat server 100 converts the setting message in the natural language from the user terminal 120 into a pair of the database ID to be a change target (a correction target) and a change value (a correction value). The change value is a value that is rewritten to the database value described with reference to FIGS. 5A and 5B. This process is performed in two steps. First, the database ID to be the change target is determined from a word included in the message. Then, the change value of the database value for the determined database ID is determined from the word included in the message.

FIG. 6B illustrates a database ID determination rule in which one of the database IDs of USB_SCAN_TYPE and USB_SCAN_ENABLE is selected according to the setting message from the user terminal 120. For example, in a case where the setting message includes words of "scan" and "USB", the database ID of USB_SCAN_TYPE is the correction target. Further, in addition to this, a plurality of rules is provided for the same database ID such as "scanner" and "USB" or "read document" and "USB" in the setting message, whereby fluctuations in the natural language from the user terminal 120 can be dealt with. At the same time, information about whether the administrator authority is required is also stored for each database ID.

FIG. 6C illustrates a correction value determination rule for determining the database value according to the setting message from the user terminal 120 at the time the database ID to be corrected is determined. For example, if "PDF" is included in the setting message in a case of correcting the database ID of USB_SCAN_TYPE, the correction value is PDF. On the other hand, if "prohibit" is included in the setting message in a case of correcting the database ID of USB_SCAN_ENABLE, the correction value is 0. Further, a text to be notified to the user terminal in a case where the setting is successful in the image forming apparatus 150 is defined in advance for each pair of the database ID and the correction value. According to the present embodiment, some conversion rules are defined in advance and the database ID to be corrected is specified, but this method does not limit the present disclosure. For example, a method in which a template document indicating the setting content for each database ID is defined in advance and document similarity between the template document and the setting message from the user terminal 120 is compared may be used, and a method using another natural language processing may also be used.

As described above, when the setting message is converted into the database ID to be corrected and the database value, the chat server 100 transmits the database ID and the database value to the image forming apparatus 150 in the XML file format illustrated in FIG. 5B.

Figure 7A:
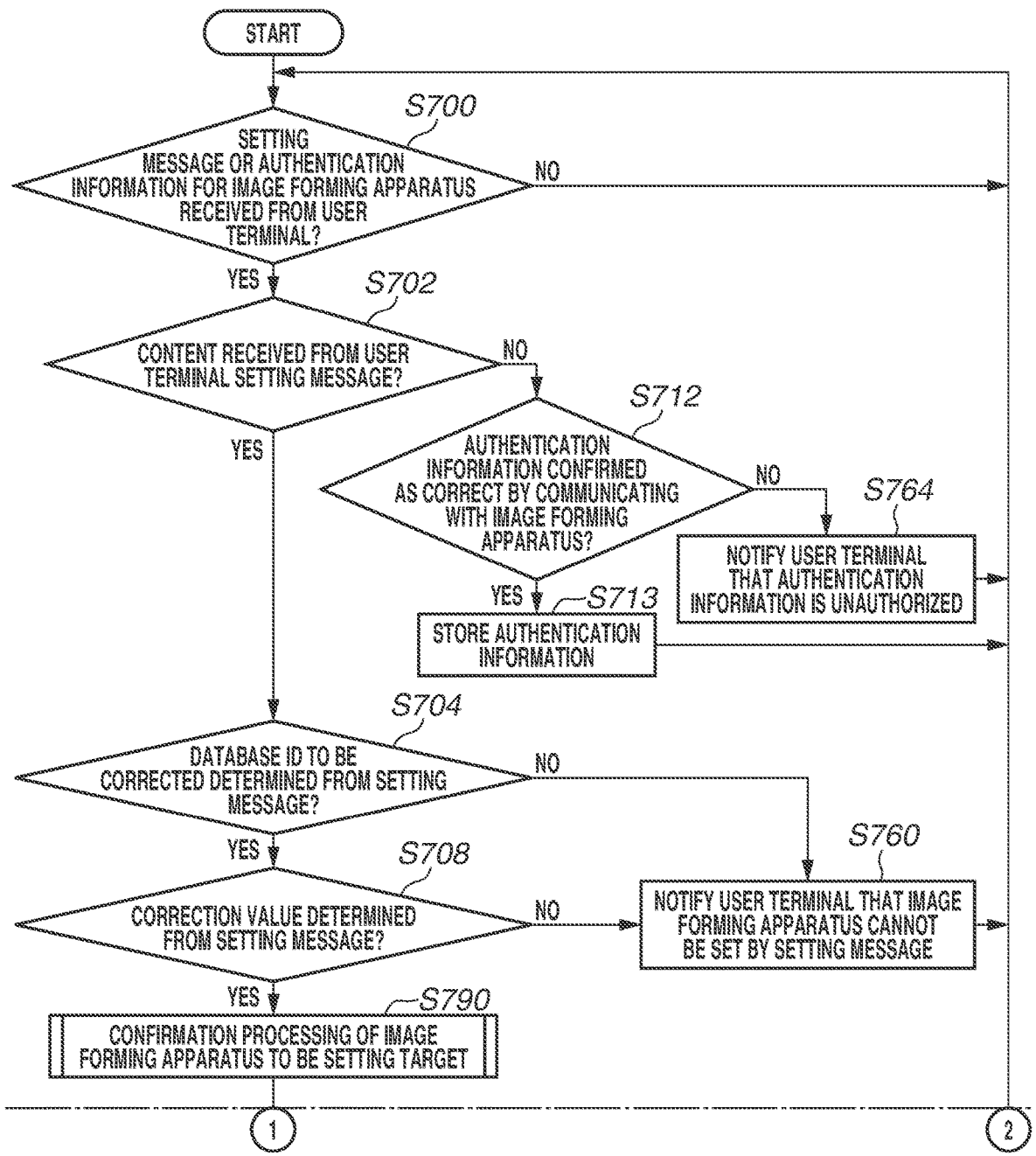

FIG. 7 is a flowchart illustrating processing performed by the chat server 100 in a case where the setting message is transmitted from the user terminal 120. Processing in each step in the present flowchart is realized by the CPU 301 reading a program stored in the storage 304 to the RAM 302 and executing the program.

In step S700, the chat server 100 waits to receive the setting message or authentication information for the image forming apparatus 150 from the user terminal 120. Here, the authentication information is information such as a user ID and a password used to log into the image forming apparatus 150. As the authentication information for the image forming apparatus, the one for the remote UI may be used, or a new authentication system may be provided for the present flow.

In step S702, the chat server 100 determines whether the information received in step S700 is the setting message or the authentication information. If it is the setting message (YES in step S702), the processing proceeds to step S704. If it is the authentication information (NO in step S702), the processing proceeds to step S712.

In step S704, the chat server 100 determines whether the database ID to be the correction target has been determined using a method for the natural language processing illustrated in FIGS. 6A to 6C. At this time, in a case where the setting based on the setting message is impossible because it is not included in the database ID determination rule illustrated in FIG. 6B (NO in step S704), in step S760, the chat server 100 notifies the user terminal 120 of the fact. In a case where the database ID has been determined (YES in step S704), in step S708, the chat server 100 determines whether the correction value has been determined. At this time, in a case where the setting based on the setting message is impossible because it is not included in the correction value determination rule illustrated in FIG. 6C (NO in step S708), in step S760, the chat server 100 notifies the user terminal 120 of the fact in a similar manner.

In step S790, the chat server 100 performs confirmation processing of the image forming apparatus to be set by the database ID. The confirmation processing here is not related to the present embodiment and thus is handled as an empty subroutine. After step S790, the processing proceeds to step S716. In step S712, the chat server 100 communicates with the image forming apparatus 150 to confirm whether the authentication information is correct. Specifically, the chat server 100 receives an authentication result from the image forming apparatus 150 and confirms the received authentication result. If the authentication information is confirmed (YES in step S712), in step S713, the authentication information is stored. On the other hand, if the authentication information is unauthorized (NO in step S712), in step S764, the chat server 100 notifies the user terminal of the fact.

Subsequently, in step S716, the chat server 100 confirms whether the authentication information transmitted to the image forming apparatus 150 in step S712 includes authority necessary for correcting a pair of the database ID and the correction value determined in step S708 based on the database ID determination rule illustrated in FIG. 6B. If the authority is not satisfied (NO in step S716), in step S768, the chat server 100 notifies the user terminal 120 to access again from the URL for the administrator. In a case where there is no required authentication information at the time of confirming in step S716, in step S768, the chat server 100 may notify the user terminal 120 to access again.

In step S720, the chat server 100 transmits the pair of the database ID and the correction value determined by the processing up to this point to the image forming apparatus 150 using an XML format file illustrated in FIG. 5B, then in step S724, the chat server 100 waits for a response from the image forming apparatus 150.

In step S728, if the response from the image forming apparatus 150 indicates that the setting is successful (YES in step S728), in step S732, the chat server 100 notifies the user terminal 120 of the message illustrated in FIG. 6C in a case where the setting is successful. On the contrary, if the response from the image forming apparatus 150 indicates that the setting has failed (NO in step S728), in step S772, the chat server 100 notifies the user terminal 120 that the setting for the image forming apparatus 150 has failed.

FIG. 7 illustrates a configuration in which the image forming apparatus 150 performs login authentication, but the chat server 100 may be configured to have an authentication function. In this case, in step S720, the chat server 100 is configured to transmit user information authenticated by the chat server 100 together with the XML file to be transmitted to the image forming apparatus 150.

Figure 8:
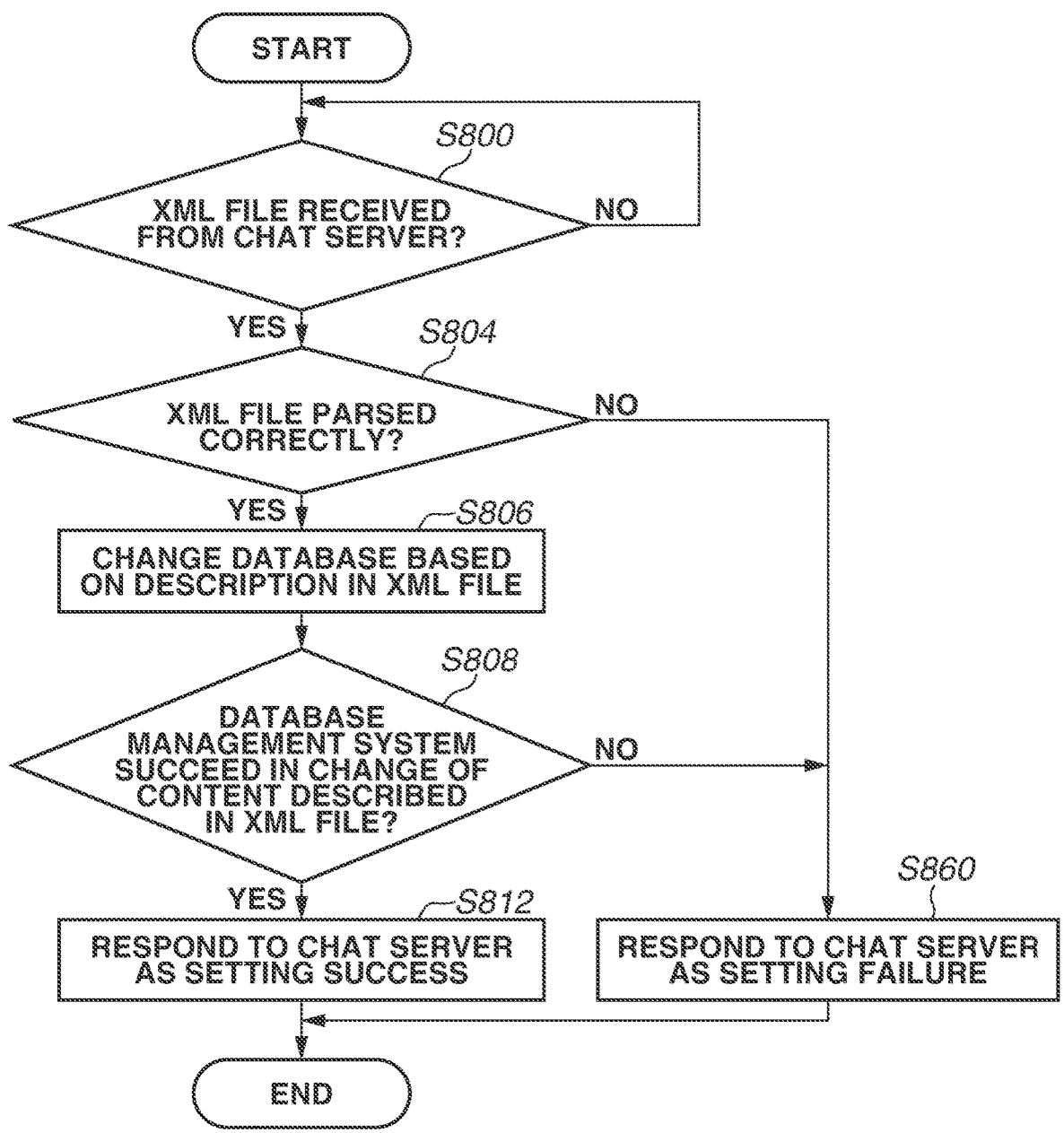
FIG. 8 is an example of a flowchart illustrating processing performed by the image forming apparatus at a time of receiving an XML file.

FIG. 8 is a flowchart illustrating processing performed by the image forming apparatus 150 in a case where the XML file is transmitted from the chat server 100. Processing in each step in the present flowchart is realized by the CPU 201 reading a program stored in the storage 204 to the RAM 202 and executing the program.

In step S800, the image forming apparatus 150 waits to receive the XML file from the chat server 100. In step S804, the image forming apparatus 150 confirms whether the received XML file has been parsed correctly. In other words, the image forming apparatus 150 confirms whether parsing processing has been performed on the content described in the received XML file. At this time, if the XML file is unauthorized (NO in step S804), in step S860, the image forming apparatus 150 responds to the chat server 100 that the setting has failed.

Subsequently, in step S806, the image forming apparatus 150 changes the device setting based on the content described in the XML file. Specifically, the image forming apparatus 150 identifies the device setting as the change target from the database managed in the database management system based on the database ID described in the XML file and rewrites the database value corresponding to the database ID to the change value described in the XML file.

In step S808, the image forming apparatus 150 confirms with the database management system whether correction of the content described in the XML file is successful. If the correction is successful (YES in step S808), in step S812, the image forming apparatus 150 responds to the chat server 100 that the setting is successful. If the correction fails (NO in step S808), in step S860, the image forming apparatus 150 responds to the chat server 100 that the setting has failed.

Figure 9:
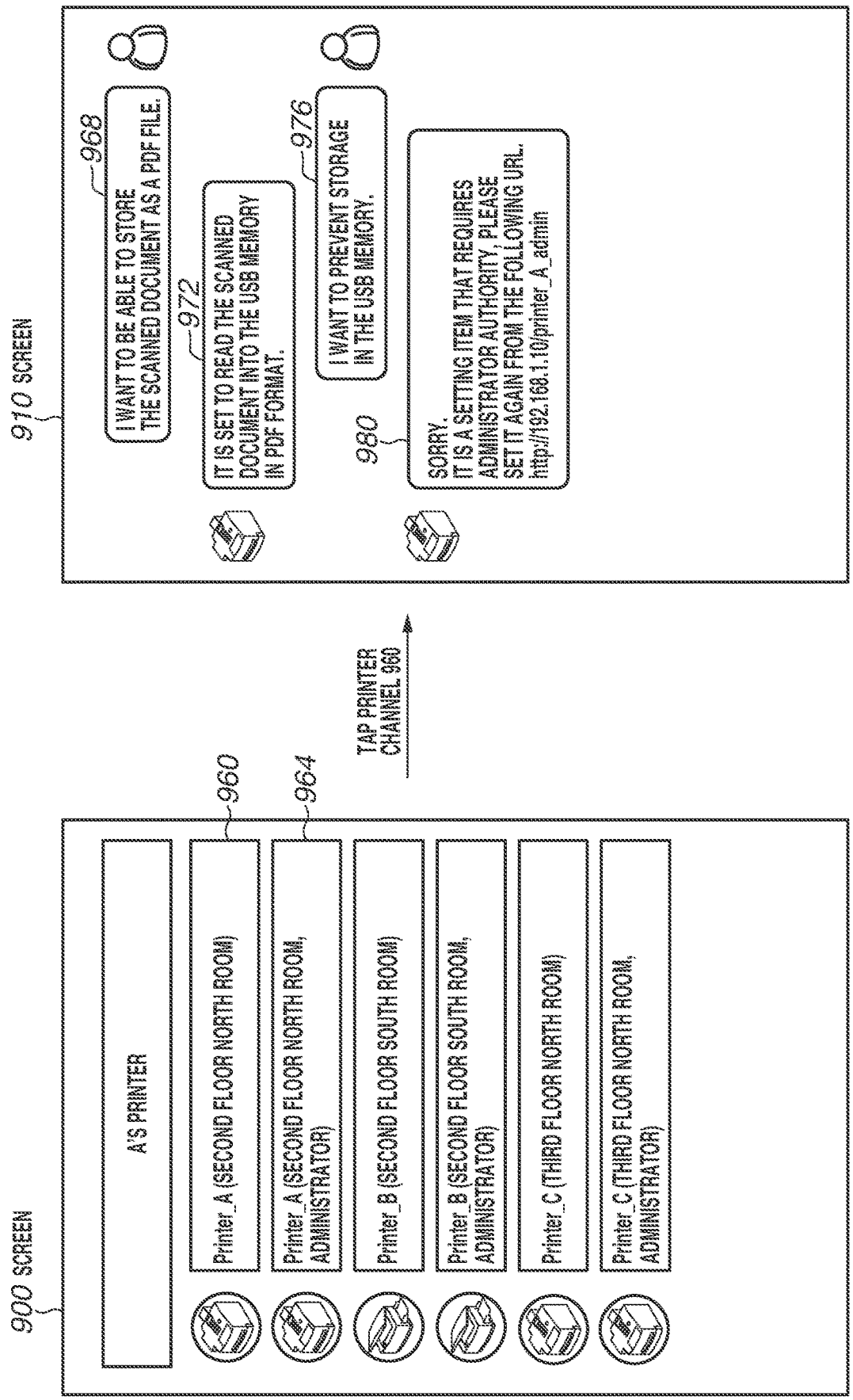
FIG. 9 illustrates an example of a screen of the user terminal at a time of transmitting a setting message.

FIG. 9 illustrates an example of screens on the operation unit 412 in a case where the user terminal 120 transmits the setting message to the chat server 100.

A screen 900 is an example in which the image forming apparatuses 150 that can be set by the user terminal 120 are drawn as the printer channels by authority. On the screen 900, settings can be made for Printer_A, Printer_B, and Printer_C, and all of the image forming apparatuses 150 can be set with both of general user authority and the administrator authority. If a printer channel 960 is tapped, the screen changes to a screen 910 on which the setting for Printer_A can be performed with the general user authority. Information about an installation location stored and managed by each image forming apparatus 150 may also be displayed in the printer channel 960. As the information about the installation location, a detail of the installation location may be acquired at the time of acquiring the printer name from the image forming apparatus 150. On the screen 910, a file format for storing a scanned document in the USB memory is set to a PDF file, and the setting is successful, as illustrated by speech balloons 968 and 972. Then, in speech balloons 976 and 980, although a setting is made to prevent storage in the USB memory, the setting fails because the user lacks administrator authority, and a URL for the administrator is presented. In a case where the Internet browser is used by the user terminal 120, tapping a URL portion switches to a screen for the administrator of Printer_A. In a case where the chat application is used, a screen transition equivalent to tapping a printer channel 964 may be performed, for example, five seconds after the speech balloon 980 is displayed without presenting the URL in the speech balloon 980.

Accordingly, a user can change the setting of the image forming apparatus 150 by inputting a setting content in the natural language and transmitting the setting content to the image forming apparatus 150 in the XML file by the natural language processing by the chat server 100.

A remote UI that can perform a device setting in the same manner as the present disclosure will be described. The remote UI can use the administrator authority and the general user authority appropriately by inputting a user ID and a password, and thus is useful and widely used for setting the image forming apparatus. The remote UI is thus convenient, and in a case where a user regularly performs a fixed setting, the user can efficiently perform the setting of the image forming apparatus without directly operating the image forming apparatus also because a setting point is clear on the Internet browser. However, while the remote UI can perform a very large number of device settings, it also has challenges. For example, it is difficult for a user to find a page of an intended setting point with the remote UI. In addition, in a case where an intended setting is managed by the administrator authority and is not displayed to a general user, the user cannot easily reach the intended device setting with the remote UI. By performing the device setting from the user terminal 120 via the chat server 100 as described above, it is possible to change the intended device setting more easily than performing the device setting on the remote UI displayed on the user terminal 120.

A second embodiment will be described with reference to FIGS. 1 to 8 and 10 to 12.

The descriptions about FIGS. 1 to 6 and 8 are the same as those according to the first embodiment.

According to the second embodiment, in a case where the image forming apparatus 150 makes a notification to a user, the image forming apparatus 150 can make a notification to the user terminal 120 via the chat server 100, and the user terminal 120 can perform setting on a plurality of the image forming apparatuses 150 at the same time. Here, a notification to a user corresponds to a content of notification to a user such as output to the operation unit 212 of the image forming apparatus 150. The content is not only output to the operation unit 212 but also notified to the user terminal 120. As for the content of notification to the user, according to the present embodiment, an example of a case where storage in a USB memory exceeds 1 GB in Printer_B will be described.

FIGS. 10A and 10B are flowcharts respectively illustrating processing performed by the image forming apparatus 150 and the chat server 100 in a case where the image forming apparatus 150 makes a notification to the user terminal 120.

FIG. 10A is the flowchart illustrating processing performed by the image forming apparatus 150. First, in step S1000, the image forming apparatus 150 waits for a user notification content generated by any application operating thereon. If the user notification content is generated (YES in step S1000), in step S1004, the image forming apparatus 150 transmits the user notification content to the chat server 100 as it is as a notification message.

FIG. 10B is the flowchart illustrating processing performed by the chat server 100. In step S1060, the chat server 100 waits to receive the notification message from the image forming apparatus 150. If the notification message is received (YES in step S1060), in step S1064, the chat server 100 confirms whether a user with the printer channel for the image forming apparatus 150 that has transmitted the notification message exists. The confirmation is performed by searching the printer channel management table described with reference to FIG. 3. If the user does not exist (NO in step S1064), again in step S1060, the chat server 100 waits to receive the notification message from the image forming apparatus 150. If the user exists (YES in step S1064), in step S1068, the chat server 100 transmits the notification message to an administrator printer channel for the image forming apparatus of each user.

Figure 11:
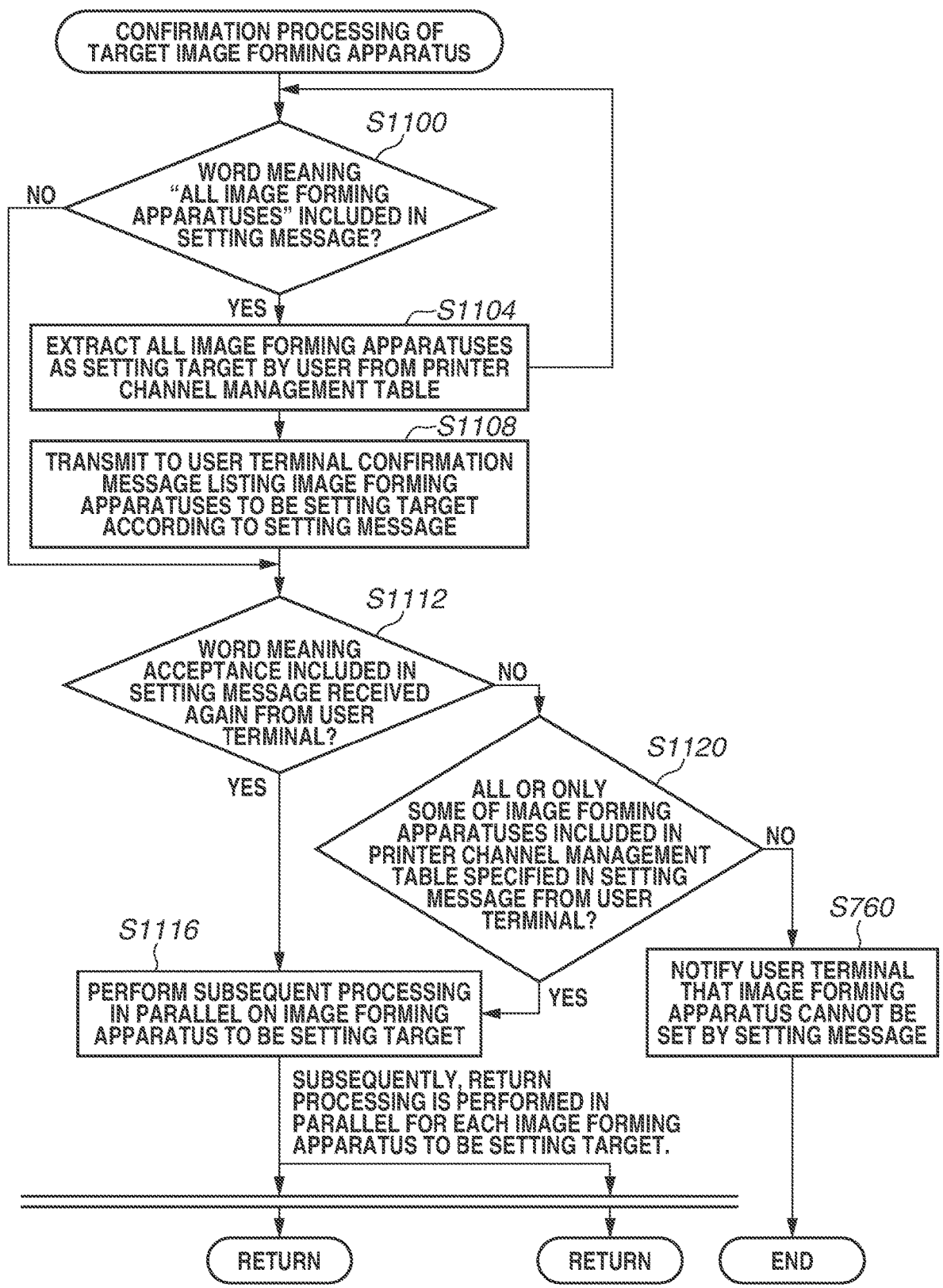
FIG. 11 is an example of a flowchart illustrating processing performed by a chat server at a time of receiving a setting message according to a second embodiment.

FIGS. 7 and 11 are flowcharts illustrating processing performed by the chat server 100 in a case where the user terminal 120 performs a setting for a plurality of the image forming apparatuses 150 at the same time. The processing is performed to specify the image forming apparatus 150 described in the setting message from the user terminal 120. Regarding FIG. 7, the only difference between the present embodiment and the first embodiment is that subroutine processing in step S790 is performed.

FIG. 11 is the flowchart illustrating confirmation processing of the target image forming apparatus performed in the subroutine in step S790.

In step S1100, the chat server 100 confirms whether the setting message includes a word meaning "all image forming apparatuses", and if the word is included (YES in step S1100), the processing proceeds to step S1104. The processing is performed by the natural language processing, but is not performed based on the database ID determination rule or the correction value determination rule.

In step S1104, the chat server 100 extracts all the image forming apparatuses to be a setting target by the user from the printer channel management table described with reference to FIG. 3. In step S1108, the chat server 100 transmits to the user terminal 120 a confirmation message listing the image forming apparatuses to be the setting target according to the setting message.

In step S1112, the chat server 100 receives the setting message from the user terminal 120 again as a response to the confirmation message. Upon receiving, the chat server 100 confirms whether the setting message includes a word meaning acceptance, and if the word is included (YES in step S1112), the processing proceeds to step S1116. In step S1116, the chat server 100 performs subsequent processing in the main routine in parallel for the image forming apparatus 150, which are the setting targets. If the word is not included (NO in step S1112), in step S1120, the chat server 100 confirms whether all or only some of the image forming apparatuses included in the printer channel management table are specified in the setting message from the user terminal 120. If it is confirmed (YES in step S1120), the processing proceeds to step S1116, and if it cannot be confirmed (NO in step S1120), in step S760, the chat server 100 notifies the user terminal 120 of the fact that the setting for the image forming apparatus 150 cannot be performed by the setting message.

Figure 12:
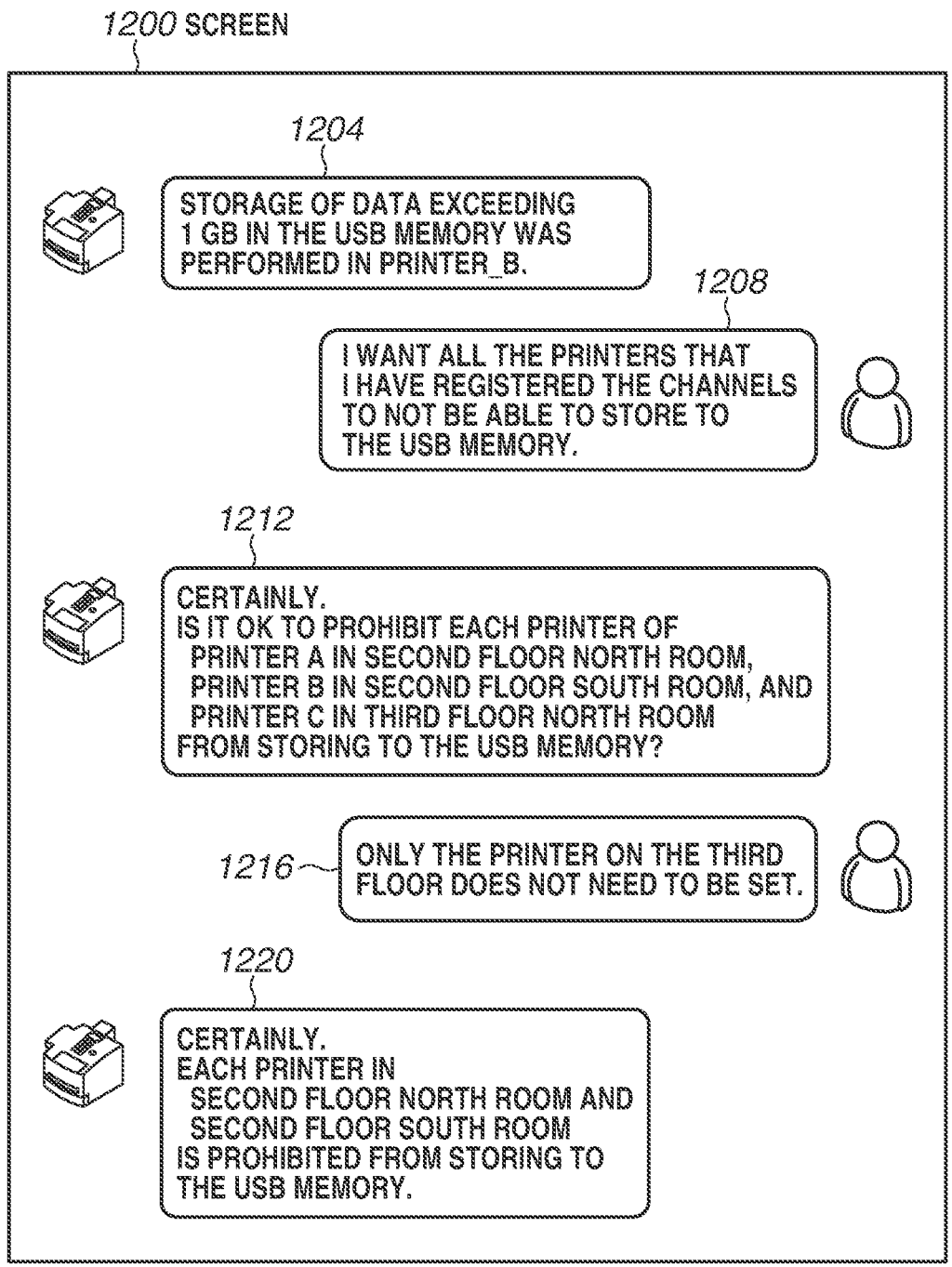
FIG. 12 illustrates an example of a screen on the user terminal at a time of transmitting a setting message.

FIG. 12 illustrates an example of a screen for the administrator of Printer_B on the operation unit 412 in a case where the user terminal 120 receives a notification from the image forming apparatus 150 and transmits the setting message to the chat server 100.

On a screen 1200, the user terminal 120 receives a notification from the image forming apparatus 150 in a speech balloon 1204. An action of the user terminal 120 in response to the notification is indicated in a speech balloon 1208, and here, the user sets all printers, the printer channels of which are registered by the user, so that storage into the USB memory is prohibited. In a speech balloon 1212, all printers registered by the user are listed. In response to this, the user terminal 120 excludes some printers from the setting target. Finally, in a speech balloon 1220, the printers that have been successfully set are listed.

Accordingly, the user terminal 120 can receive a notification from the image forming apparatus 150 and perform a setting for a plurality of the image forming apparatuses 150.

According to the present disclosure, a user of an image forming apparatus can easily perform various settings for the image forming apparatus by inputting a setting content for the image forming apparatus in a natural language to a chat server. Further, a user can also receive a notification from the image forming apparatus and perform the same setting for a plurality of image forming apparatuses using the natural language.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-171911, filed Oct. 27, 2022, which is hereby incorporated by reference herein in its entirety.

What is claimed is:

1. An information processing apparatus communicatively connected to a user terminal and an image forming apparatus, the information processing apparatus comprising:
   one or more controllers having one or more processors and one or more memories, the one or more controllers being configured:
      to receive a message of a text described in a natural language from the user terminal;
      to determine information about a device setting of the image forming apparatus from a word included in the message; and
      to transmit the information about the determined device setting to the image forming apparatus,
         wherein the information processing apparatus is communicably connected to a plurality of image forming apparatuses, and
         wherein the one or more controllers transmit, based on the message, the information about the device setting to a first image forming apparatus and does not transmit the information about the device setting to a second image forming apparatus different from the first image forming apparatus.

2. The information processing apparatus according to claim 1, wherein the one or more controllers are further configured: to store the word included in the received message and the device setting of the image forming apparatus in association with each other, wherein the one or more controllers determine the information about the device setting of the image forming apparatus from the message based on the association stored in the storage unit.

3. The information processing apparatus according to claim 1, wherein the one or more controllers determine a device setting to be a setting change target and a change value.

4. The information processing apparatus according to claim 1,
wherein the one or more controllers are further configured:
to perform login authentication of a user,
to receive an authentication result of the login authentication, and
wherein, in a case where the user authenticated by the login authentication has authority to perform the determined device setting, the one or more controllers transmit the information about the device setting determined by the determination unit to the image forming apparatus.

5. The information processing apparatus according to claim 1,
wherein the one or more controllers are further configured:
to perform login authentication of a user,
to receive an authentication result of the login authentication; and
to, in a case where the user authenticated by the login authentication does not have authority to perform the device setting determined by the determination unit, notify the user terminal of information for displaying on the user terminal a statement that prompts the user to access again.

6. The information processing apparatus according to claim 5,
wherein the device setting includes a device setting requiring administrator authority that can only be set by an administrator, and
wherein, in a case where the determined device setting is the device setting requiring the administrator authority, the notification unit notifies the user terminal of information for displaying on the user terminal a statement that prompts the user to access as an administrator.

7. The information processing apparatus according to claim 5, wherein, when a response regarding a change of a device setting is received from the image forming apparatus, the one or more controllers notify the user terminal of information for displaying success or failure of the device setting on the user terminal.

8. The information processing apparatus according to claim 1, wherein the message is text information in the natural language received from a user via a chat application of the user terminal.

9. The information processing apparatus according to claim 1, wherein the information about the device setting transmitted to the image forming apparatus is transmitted in an Extensible Markup Language (XML) file format.

10. The information processing apparatus according to claim 1, wherein the information processing apparatus is a chat server.

11. The information processing apparatus according to claim 1, wherein the information about the device setting is information specifying a storage format of a scanned image generated by scanning.

12. The information processing apparatus according to claim 1, wherein the information about the device setting is information as to whether to permit storage of a scanned image generated by scanning in a Universal Serial Bus (USB) memory.

13. The information processing apparatus according to claim 1, wherein the first image forming apparatus is an image forming apparatus selected via the user terminal as a transmission destination of the information.

14. An image forming apparatus communicatively connected to an information processing apparatus, the image forming apparatus comprising:
one or more controllers having one or more processors and one or more memories, the one or more controllers being configured as:
a reception unit configured to receive information about a device setting from the information processing apparatus; and
a control unit configured to change a device setting of the image forming apparatus based on the received information about the device setting,
wherein the information processing apparatus is communicably connected to a plurality of image forming apparatuses, and
wherein the one or more controllers transmit, based on the message, the information about the device setting to a first image forming apparatus and does not transmit the information about the device setting to a second image forming apparatus different from the first image forming apparatus.

15. The image forming apparatus according to claim 14, wherein the one or more controllers are further configured as:
a storage unit configured to store the device setting of the image forming apparatus and a setting value in association with each other,
wherein the information about the device setting includes a device setting to be a change target and a change value, and
wherein the control unit performs control to change a setting value, of the device setting to be the change target, to the change value.

16. A method for controlling an information processing apparatus communicatively connected to a user terminal and an image forming apparatus, the method comprising:
receiving a message of a text described in a natural language from the user terminal;
determining information about a device setting of the image forming apparatus from the message; and
transmitting the determined information about the device setting to the image forming apparatus,
wherein the information processing apparatus is communicably connected to a plurality of image forming apparatuses, and
wherein the one or more controllers transmit, based on the message, the information about the device setting to a first image forming apparatus and does not transmit the information about the device setting to a second image forming apparatus different from the first image forming apparatus.

17. The method according to claim 16,
wherein the information processing apparatus includes a storage unit configured to store a word included in the received message and the device setting of the image forming apparatus in association with each other, and
wherein the determining determines the information about the device setting of the image forming apparatus from the message based on association stored in the storage unit.

18. The method according to claim 16, wherein the determining determines a device setting to be a setting change target and a change value each.

* * * * *